US005766731A

United States Patent [19]

Stein et al.

[11] Patent Number: 5,766,731

[45] Date of Patent: Jun. 16, 1998

[54] HEAT-TRANSFER LABEL

[75] Inventors: Samuel H. Stein, Westborough; Onsy Y. Makar, Framingham, both of Mass.; Jean Paul Laprade, North Smithfield, R.I.

[73] Assignee: Avery Dennison Corporation, Pasadena, Calif.

[21] Appl. No.: 625,013

[22] Filed: Mar. 29, 1996

[51] Int. Cl.[6] .......... B32B 3/00

[52] U.S. Cl. .......... 428/195; 428/204; 428/411.1; 428/488.4; 428/500; 428/522; 428/913; 156/235; 156/240

[58] Field of Search .......... 156/235, 240; 428/40.1, 195, 411.1, 913, 204, 488.4, 500, 522; 430/14, 18

[56] References Cited

U.S. PATENT DOCUMENTS

| | | | |
|---|---|---|---|
| 3,922,435 | 11/1975 | Asnes . | |
| 4,275,104 | 6/1981 | De Nagybaczon | 428/195 |
| 4,426,422 | 1/1984 | Daniels . | |
| 4,548,857 | 10/1985 | Galante . | |
| 4,610,744 | 9/1986 | Smith et al. | 156/235 |
| 4,927,709 | 5/1990 | Parker et al. . | |
| 4,935,300 | 6/1990 | Parker et al. . | |
| 5,143,976 | 9/1992 | Ashihara et al. | 525/227 |

OTHER PUBLICATIONS

Technical literature, Elvacite® Acrylic Resins, ICI Acrylics Inc., Wilmington, DE (1994).

Technical literature, Benzoflex® S–404 glyceryl tribenzoate, Velsicol Chemical Corporation, Chicago, IL, publicly available prior to the filing of the present application, undated.

Technical literature, chlorinated polyolefin CP–343–1, Eastman Chemical Products Inc., Kingsport, TN (1985).

*Primary Examiner*—William Krynski
*Attorney, Agent, or Firm*—Kriegsman & Kriegsman

[57] ABSTRACT

A heat-transfer label particularly well-suited for styrene-acrylonitrile surfaces and containers. In one embodiment, the label includes a support portion, a skim coat of wax on top of the support portion, and a transfer portion on top of the skim coat of wax. The support portion includes a sheet of paper overcoated with a release layer of polyethylene. The transfer portion includes an acrylic protective lacquer layer, an ink layer over the protective lacquer layer, and a heat-activatable adhesive layer over the ink layer. The protective lacquer layer includes a methyl/n-butyl methacrylate copolymer and a methyl methacrylate copolymer. The ink layer includes a polyamide and/or acrylic ink. The adhesive layer includes an acrylic resin and a chlorinated polyolefin resin.

46 Claims, 1 Drawing Sheet

HEAT-TRANSFER LABEL

BACKGROUND OF THE INVENTION

The present invention relates generally to heat-transfer labels and more particularly to a novel heat-transfer label particularly well-suited for styrene-acrylonitrile surfaces and the like.

Heat-transfer labels are commonly used in the decorating and/or labelling of commercial articles, such as, and without limitation to, containers for alcohols, essential oils, detergents, adverse chemicals, as well as health and beauty aids. As can readily be appreciated, heat-transfer labels are desirably resistant to abrasion and chemical effects in order to avoid a loss of label information and desirably possess good adhesion to the articles to which they are affixed.

One well-known type of heat-transfer label is described in U.S. Pat. No. 3,616,015, inventor Kingston, which issued October, 1971, and which is incorporated herein by reference. In the aforementioned patent, there is disclosed a heat-transfer label comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt so that the paper sheet can be released from the wax layer. After transfer of the design to the article, the paper sheet is immediately removed, leaving the design firmly affixed to the article and the wax layer exposed to the environment. The wax layer thus serves two purposes in that (1) it provides release of the ink design from the web upon application of heat to the web and (2) it forms a clear protective layer over the transferred ink design. After transfer of the label to the article, the transferred wax release layer is typically subjected to a post-flaming technique which produces an optically clear protective layer over the ink design and enhances the protective properties of the transferred wax release.

In some heat-transfer labels, an adhesive layer (e.g., polyamide, polyester) is deposited over the ink design to facilitate adhesion of the label onto a receiving article. An example of such a heat-transfer label is disclosed in U.S. Pat. No. 4,548,857, inventor Galante, which issued Oct. 22, 1985, and which is incorporated herein by reference. Additionally, in some heat-transfer labels, a protective layer is interposed between the wax release layer and the ink layer. An example of such a label is disclosed in U.S. Pat. No. 4,426,422, inventor Daniels, which issued Jan. 17, 1984, and which is incorporated herein by reference.

One problem that has been noted with heat-transfer labels of the type described above containing a wax release layer is that, quite often, a degree of hazing or a "halo" is noticeable over the transferred label when the transfer is made onto clear plastic materials. This "halo" effect, which persists despite post-flaming, is a result of the nature of the wax coating around the outer borders of the transferred ink design layer.

Accordingly, to overcome the aforementioned "halo" effect, considerable effort has been expended in replacing or obviating the need for a wax release layer. One such wax-less, heat-transfer label is disclosed in U.S. Pat. No. 3,922,435, inventor Asnes, which issued Nov. 25, 1975. In the aforementioned patent, the layer of wax is replaced with a layer of a non-wax resin. This non-wax resinous layer is referred to in the patent as a dry release since it does not transfer to the article along with the ink design layer. In a preferred embodiment of the patent, the non-wax resinous layer comprises a thermoset polymeric resin, such as cross-linked resins selected from the group consisting of acrylic resins, polyamide resins, polyester resins, vinyl resins and epoxy resins.

Another example of a wax-less, heat-transfer label is disclosed in U.S. Pat. No. 4,935,300, inventors Parker et al., which issued Jun. 19, 1990, and which is incorporated herein by reference. In the aforementioned patent, the label, which is said to be particularly well-suited for use on high density polyethylene, polypropylene, polystyrene, polyvinylchloride and polyethylene terephthalate surfaces or containers, comprises a paper carrier web which is overcoated with a layer of polyethylene. A protective lacquer layer comprising a polyester resin and a relatively small amount of a non-drying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the aforementioned wax-less, heat-transfer label eliminates the problem of the "halo" effect discussed previously, said label does not quite possess the same release characteristics of heat-transfer labels containing a wax release layer. Accordingly, another type of heat-transfer label differs from the heat-transfer label disclosed in U.S. Pat. No. 4,935,300, only in that a very thin layer or "skim coat" of wax or a similar material (e.g., approximately 0.1–0.4 lbs. of wax/3000 square feet of the polyethylene-coated carrier web) is interposed between the polyethylene release layer and the protective lacquer layer to improve the release of the protective lacquer from the polyethylene-coated carrier web.

Still another type of heat-transfer label, which has been used by the assignee of the present application to label polypropylene bottle caps, comprises a paper carrier web which is overcoated with a layer of polyethylene. A skim coat of wax is overcoated on the polyethylene layer. A protective lacquer layer comprising vinyl and polyester resins is printed on the skim coat. An ink design layer comprising vinyl and polyester resins is printed on the protective lacquer layer. A heat-activatable adhesive layer comprising an acrylic resin, a chlorinated polyolefin and a plasticizer is printed on the ink design layer. The acrylic resin is a butyl methacrylate resin, such as ELVACITE® 2045, which is commercially available from ICI Acrylics Inc. (Wilmington, Del.). The chlorinated polyolefin is commercially available from Eastman Chemical Products, Inc. (Kingsport, Tenn.) as chlorinated polyolefin CP-343-1. The plasticizer is a glyceryl tribenzoate, such as BENZOFLEX® S-404, which is commercially available from Velsicol Chemical Corporation (Chicago, Ill.).

Still another type of heat-transfer label, which was used by the assignee of the present application to label a polypropylene container, comprises a paper carrier web overcoated with a layer of polyethylene. A protective lacquer layer comprising a methyl methacrylate resin (ELVACITE® 2041—commercially available from ICI Acrylics Inc.), an ethyl methacrylate resin (ELVACITE® 2042—commercially available from ICI Acrylics Inc.), cellulose acetate butyrate and a plasticizer is printed on the polyethylene layer. An ink design layer comprising a polyamide ink is printed on the protective lacquer layer. A heat-activatable adhesive layer comprising an acrylic resin is printed on the ink design layer.

Still yet another type of heat-transfer label, which was used by the assignee of the present application to label styrene-acrylonitrile (SAN) containers, comprises a paper carrier web overcoated with a layer of polyethylene. A skim coat of wax is overcoated on the polyethylene layer. A protective lacquer layer comprising vinyl and polyester resins is printed onto the skim coat. An ink design layer comprising vinyl and polyester resins is printed onto the protective lacquer layer. A heat-activatable adhesive layer comprising an acrylic resin is overcoated on the ink design layer.

As can readily be appreciated, to achieve optimal label integrity and optimal adherence between a label and an article, even under conditions of chemical and/or mechanical degradation, one seeks to maximize the adhesion between the label and the article and to maximize the interlayer adhesion of the various layers of the label. Accordingly, the particular types of materials used in the adhesive, ink and protective lacquer layers may be selected to optimize interlayer adhesion, article adhesion, and/or mechanical and chemical resistance suitable for the intended use of the article. In addition, the types of materials used in the various layers of the label should be selected with an eye towards the particular type of coating and/or printing processes that are to be used in the manufacture of the label.

As an illustration of the above precepts, the present inventors note that certain heat-transfer labels (e.g., those labels having a polyester protective lacquer, a polyamide ink and an acrylic adhesive) do not exhibit optimal interlayer adhesion properties when applied to styrene-acrylonitrile containers subjected to repeated washings in conventional dishwashers with dishwasher detergents. In particular, under such dishwashing conditions, the polyester protective lacquer frequently becomes disassociated from the ink layer due to less than optimal interlayer adhesion. Other heat-transfer labels, like the heat-transfer label discussed earlier for use on SAN containers, gave less than optimal product yields and manufacturing rates, as well as exhibiting less than optimal aesthetic properties due to the types of materials used in the various layers.

SUMMARY OF THE INVENTION

It is an object of the present invention to provide a new heat-transfer label.

It is another object of the present invention to provide a heat-transfer label that overcomes at least some of the problems discussed above in connection with existing heat-transfer labels.

According to one aspect of the invention, there is disclosed a heat-transfer label which comprises (a) a support portion; and (b) a transfer portion over said support portion for transfer of the transfer portion from the support portion to an article by the application of heat to the support portion while the transfer portion is placed into contact with the article, said transfer portion comprising (i) a protective lacquer layer; (ii) an ink layer over said protective lacquer layer, said ink layer comprising a polyamide ink and/or an acrylic ink; and (iii) an adhesive layer over said polyamide ink layer, said adhesive layer comprising an acrylic resin and a chlorinated polyolefin resin.

The aforementioned heat-transfer label may or may not include a skim coat of wax interposed between the support portion and the transfer portion. The support portion preferably comprises a sheet of paper overcoated with a release layer of polyethylene. Preferably, the acrylic resin of said adhesive layer is a butyl methacrylate resin, and the adhesive further comprises a plasticizer, preferably in the form of glyceryl tribenzoate. Preferably, the butyl methacrylate resin constitutes about 65%, by weight, of the adhesive layer, the chlorinated polyolefin constitutes about 30%, by weight, of the adhesive layer, and the glyceryl tribenzoate plasticizer constitutes about 5%, by weight, of the adhesive layer. The protective lacquer layer preferably comprises an acrylic resin, said protective lacquer layer more preferably comprising a first methacrylate copolymer, such as methyl/n-butyl methacrylate copolymer, and a second methacrylate copolymer, such as methyl methacrylate copolymer. Preferably, the aforementioned first and said second methacrylate copolymers are present in the protective lacquer layer in a 3 to 2 ratio, respectively, by weight. The lacquer, ink and adhesive layers are preferably deposited by gravure printing or a similarly suitable technique using dispersions or solutions of resins in one or more volatile organic solvents.

According to another aspect of the present invention, there is disclosed a heat-transfer label comprising: (a) a support portion; (b) a skim coat of wax positioned over said support portion; and (c) a transfer portion positioned over said skim coat for transfer of the transfer portion from the support portion to an article upon application of heat to the support portion while the transfer portion is placed into contact with the article, said transfer portion comprising: (i) an acrylic protective lacquer layer; (ii) an ink layer over said acrylic protective lacquer layer; and (iii) an adhesive layer over said ink layer.

Preferably, the acrylic protective lacquer layer of the aforementioned heat-transfer label comprises a first methacrylate copolymer, such as a methyl/n-butyl methacrylate copolymer, and a second methacrylate copolymer, such as a methyl methacrylate copolymer. Preferably, the aforementioned first and said second methacrylate copolymers are present in the protective lacquer layer in a 3 to 2 ratio, respectively, by weight. The support sheet of the aforementioned heat-transfer label preferably comprises a sheet of paper overcoated with a release layer of polyethylene. The ink layer of said heat-transfer label preferably comprises a polyamide ink and/or an acrylic ink. The adhesive layer of the heat-transfer label is preferably heat-activatable and comprises an acrylic resin, such as a butyl methacrylate resin, and a chlorinated polyolefin resin. The adhesive layer may further comprise a plasticizer.

According to still another aspect of the present invention, there is disclosed a method of labelling a styrene-acrylonitrile surface, said method comprising the steps of (a) providing a heat-transfer label, said heat-transfer label comprising (i) a support portion, and (ii) a transfer portion over said support portion for transfer of the transfer portion from the support portion to a styrene-acrylonitrile surface upon application of heat to the support portion while the transfer portion is placed into contact with the styrene-acrylonitrile surface, said transfer portion comprising an adhesive layer, said adhesive layer comprising an acrylic resin and a chlorinated polyolefin resin; and (b) transferring said transfer portion from said support portion to the styrene-acrylonitrile surface.

The aforementioned heat-transfer label may or may not include a skim coat of wax interposed between the support portion and the transfer portion, the support portion preferably comprising a sheet of paper overcoated with a release layer of polyethylene. Preferably, the acrylic resin of said adhesive layer is a butyl methacrylate resin, and the adhesive layer further comprises a plasticizer, preferably in the form of glyceryl tribenzoate. Preferably, the butyl methacrylate resin constitutes about 65%, by weight, of the adhesive layer, the chlorinated polyolefin constitutes about 30%, by weight, of the adhesive layer, and the glyceryl tribenzoate plasticizer constitutes about 5%, by weight, of the adhesive layer. The transfer portion preferably further comprises a protective lacquer layer and an ink layer, the ink layer being positioned over the protective lacquer layer, the adhesive layer being positioned over the ink layer. The protective lacquer layer preferably comprises an acrylic resin, and the ink layer preferably comprises a polyamide ink and/or an acrylic ink.

According to still yet another aspect of the present invention, there is disclosed a method of labelling a styrene-acrylonitrile surface, said method comprising the steps of (a) providing a heat-transfer label, said heat-transfer label comprising (i) a support portion, and (ii) a transfer portion over said support portion for transfer of the transfer portion from the support portion to a styrene-acrylonitrile surface upon application of heat to the support portion while the transfer portion is placed into contact with the styrene-acrylonitrile surface, said transfer portion comprising an acrylic protective lacquer layer; and (b) transferring said transfer portion from said support portion to the styrene-acrylonitrile surface.

The aforementioned heat-transfer label may or may not include a skim coat of wax interposed between the support portion and the transfer portion, the support portion preferably comprising a sheet of paper overcoated with a release layer of polyethylene. Preferably, the acrylic protective lacquer layer of the aforementioned heat-transfer label comprises a first methacrylate copolymer, such as a methyl/n-butyl methacrylate copolymer, and a second methacrylate copolymer, such as a methyl methacrylate copolymer. Preferably, the aforementioned first and said second methacrylate copolymers are present in the protective lacquer layer in a 3 to 2 ratio, respectively, by weight. The transfer portion preferably further comprises an ink layer over said protective lacquer layer and an adhesive layer over said ink layer. The ink layer preferably comprises a polyamide ink and/or an acrylic ink, and the adhesive layer is preferably heat-activatable and comprises an acrylic resin and a chlorinated polyolefin resin.

According to a further aspect of the present invention, there is disclosed a protective lacquer for use in a heat-transfer label, said protective lacquer comprising a first methacrylate copolymer and a second methacrylate copolymer, said first methacrylate copolymer being a methyl/n-butyl methacrylate copolymer, said second methacrylate copolymer being a methyl methacrylate copolymer. Preferably, said first and said second methacrylate copolymers are present in said protective lacquer layer in a 3 to 2 ratio, respectively, by weight.

According to still a further aspect of the present invention, there is disclosed a transfer portion of a heat-transfer label, said transfer portion comprising (a) an acrylic protective lacquer layer; (b) an ink design layer positioned over said acrylic protective lacquer layer, said ink design layer comprising an acrylic ink and/or a polyamide ink; and (c) an adhesive layer positioned over said ink design layer, said adhesive layer comprising an acrylic resin and a chlorinated polyolefin resin.

Preferably, the acrylic resin of said adhesive layer is a butyl methacrylate resin, and the adhesive layer further comprises a plasticizer, preferably glyceryl tribenzoate. The butyl methacrylate resin preferably constitutes about 65%, by weight, of said adhesive layer, with said chlorinated polyolefin preferably constituting about 30%, by weight, of said adhesive layer and said glyceryl tribenzoate plasticizer preferably constituting about 5%, by weight, of said adhesive layer. The protective lacquer layer preferably comprises a first methacrylate copolymer and a second methacrylate copolymer, the first methacrylate copolymer of said protective lacquer layer being a methyl/n-butyl methacrylate copolymer and the second methacrylate copolymer of said protective lacquer layer being a methyl methacrylate copolymer, said first and second methacrylate copolymers being present in said protective lacquer layer in a 3 to 2 ratio, respectively, by weight.

For purposes of the present specification and claims, it is to be understood that terms used herein, such as "on" or "over," when used to denote the relative positions of two or more layers of a heat-transfer label are primarily used to denote such relative positions in the context of how those layers are situated prior to transfer of the transfer portion of the label to an article since, after transfer, those layers which were furthest removed from the associated support sheet are now closest to the labelled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawing, which is hereby incorporated into and constitutes a part of this specification, illustrates a preferred embodiment of the invention and, together with the description, serves to explain the principles of the invention. In the drawing wherein like reference numerals represent like parts.

DETAILED DESCRIPTION OF PREFERRED EMBODIMENTS

Figure 1:
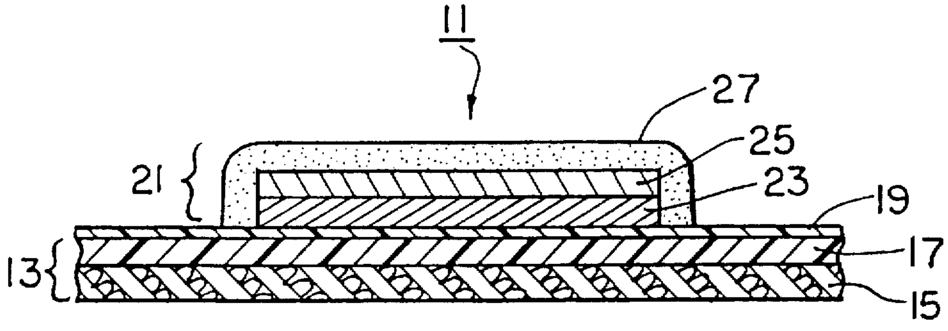
FIG. 1 is a schematic section view of one embodiment of a heat-transfer label particularly well-suited for styrene-acrylonitrile surfaces constructed according to the teachings of the present invention.

Referring now to FIG. 1, there is shown a schematic section view of one embodiment of a heat-transfer label that is particularly well-suited for, but not limited to use on, styrene-acrylonitrile surfaces, the heat-transfer label being constructed according to the teachings of the present invention and being represented generally by reference numeral 11.

Label 11 comprises a support portion 13. Support portion 13, in turn, comprises a carrier web 15 overcoated with a polyethylene layer 17. Carrier web 15 is typically made of paper or a similarly suitable substrate. Details of polyethylene layer 17 are disclosed in U.S. Pat. No. 4,935,300, discussed above, and in U.S. Pat. No. 4,927,709, inventors Parker et al., which issued on May 22, 1990, which is incorporated herein by reference.

Label 11 also comprises a very thin layer or "skim coat" of wax 19 coated directly on top of the entirety of polyethylene layer 17. Skim coat 19, which has a thickness corresponding to approximately 0.1–0.4 lbs. of the wax spread over 3000 square feet of layer 17, serves to facilitate release of the transfer portion of label 11 from support portion 13. During label transfer, a small portion of skim coat 19 is transferred along with the transfer portion of label 11 onto the article being labelled, the amount of wax transferred onto the article being labelled not being readily discernible.

Label 11 further comprises a transfer portion 21. Transfer portion 21, in turn, includes a protective lacquer layer 23 printed directly on top of a portion of skim coat 19, an ink design layer 25 printed onto a desired area of lacquer layer 23, and a heat-activatable adhesive layer 27 printed onto design layer 25.

Protective lacquer layer 23 comprises ELVACITE® 2013 acrylic resin (ICI Acrylics Inc., Wilmington, Del.), a low molecular weight methyl/n-butyl methacrylate copolymer having an inherent viscosity of 0.17 (as measured in a solution containing 0.25 g of polymer in 50 ml methylene chloride, measured at 20° C. using a No. 50 Cannon-Fenske Viscometer), and ELVACITE® 2014 acrylic resin (ICI Acrylics Inc., Wilmington, Del.), a medium molecular weight methyl methacrylate copolymer having an inherent viscosity of 0.40 (as measured in the manner described above). The ELVACITE® 2013 and 2014 acrylic resins are present in lacquer layer 23 in a 3 to 2 ratio, respectively. To form lacquer layer 23, a lacquer solvent system comprising ELVACITE® 2013 and 2014 acrylic resins and a suitable volatile organic solvent, such as methyl ethyl ketone or the like, is deposited onto a desired area of skim coat 19, preferably by gravure printing or a similar technique. The ELVACITE® 2013 and 2014 acrylic resins are present in the lacquer solvent system in the 3 to 2 ratio discussed above and collectively constitute about 35%, by weight, of the lacquer solvent system, with the volatile organic solvent constituting the remaining approximately 65% of the lacquer solvent system. After deposition of the lacquer solvent system on the desired area of skim coat 19, the volatile solvent evaporates, leaving only the non-volatile ELVACITE® 2013 and 2014 acrylic resins to make up lacquer layer 23.

Ink design layer 25 of transfer portion 21 comprises one or more polyamide and/or acrylic inks conventionally used in the ink design layer of heat-transfer labels. Ink design layer 25 is formed in the conventional manner by depositing, by gravure printing or the like, an ink solvent system comprising the polyamide and/or acrylic inks and one or more volatile solvents onto one or more desired areas of lacquer layer 23. After application of the ink solvent system on lacquer layer 23, the volatile solvent portions of the ink solvent system evaporate, leaving only the non-volatile ink components to form layer 25.

Heat-activatable adhesive layer 27 of transfer portion 21 comprises about 65%, by weight, ELVACITE® 2045 acrylic resin (ICI Acrylics Inc., Wilmington, Del.)—a high molecular weight isobutyl methacrylate resin having an inherent viscosity of 0.64 (as measured in the manner described above)—about 30%, by weight, CP-343-1 chlorinated polyolefin (Eastman Chemical Products, Inc., Kingsport, Tenn.), and about 5%, by weight, BENZOFLEX® S-404 glyceryl tribenzoate (Velsicol Chemical Corporation, Chicago, Ill.). Adhesive layer 27 is formed by depositing onto ink layer 25, by gravure printing or the like, an adhesive solvent system comprising about 17%, by weight, ELVACITE® 2045 acrylic resin, about 8%, by weight, solid (powder) CP-343-1 chlorinated polyolefin, about 1.5%, by weight, BENZOFLEX® S-404 glyceryl tribenzoate and about 73.5% toluene or a similarly suitable volatile organic solvent (e.g., xylene). After application of the adhesive solvent system on ink layer 25, the volatile solvent portion of the adhesive solvent system evaporates, leaving only the non-volatile acrylic resin, chlorinated polyolefin and plasticizer components to form layer 27.

Label 11 is used in the conventional manner by contacting adhesive layer 27 to a desired article while applying sufficient heat to the bottom of carrier web 15 so as to cause transfer portion 21 to be released from support portion 13 and so as to cause adhesive layer 27 to become heat-activated.

The present inventors have noted that, by using label 11 on styrene-acrylonitrile (SAN) surfaces, such as clear SAN beverage tumblers, one can achieve excellent interlayer adhesion (e.g. between ink layer and lacquer layer), as well as excellent adhesion between the label and the SAN surface, with the label possessing excellent abrasion resistance, chemical resistance and dishwasher resistance. In addition, due to its use of polyamide and acrylic inks, the present label exhibits high gloss, clarity, and high quality graphics while costing less to produce than certain labels using polyester/vinyl inks. Moreover, the present label has a lower release temperature than many labels having a polyester/vinyl lacquer layer and, therefore, may permit the faster decoration of articles, with higher manufacturing yields.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A heat-transfer label comprising:

(a) a support portion; and (b) a transfer portion positioned above said support portion for transfer of the transfer portion from the support portion to an article upon application of heat to the support portion while the transfer portion is placed into contact with the article, said transfer portion comprising:

(i) a protective lacquer layer;

(ii) an ink layer positioned above said protective lacquer layer, said ink layer comprising a polyamide ink and/or an acrylic ink; and (iii) an adhesive layer positioned above said ink layer, said adhesive layer comprising an acrylic resin and a chlorinated polyolefin resin.

2. The heat-transfer label as claimed in claim 1 wherein said transfer portion is in direct contact with said support portion.

3. The heat-transfer label as claimed in claim 1 further comprising a skim coat of wax, said skim coat being interposed between said support portion and said transfer portion and having a thickness corresponding to approximately 0.1–0.4 lbs. of wax spread over 3000 square feet.

4. The heat-transfer label as claimed in claim 1 wherein said acrylic resin of said adhesive layer is a butyl methacrylate resin.

5. The heat-transfer label as claimed in claim 1 wherein said adhesive layer further comprises a plasticizer.

6. The heat-transfer label as claimed in claim 5 wherein said plasticizer is glyceryl tribenzoate.

7. The heat-transfer label as claimed in claim 4 wherein said adhesive layer further comprises a plasticizer, said plasticizer being glyceryl tribenzoate, and wherein said butyl methacrylate resin constitutes about 65%, by weight, of said adhesive layer, said chlorinated polyolefin constitutes about 30%, by weight, of said adhesive layer and said glyceryl tribenzoate plasticizer constitutes about 5%, by weight, of said adhesive layer.

8. The heat-transfer label as claimed in claim 1 wherein said protective lacquer layer comprises an acrylic resin.

9. The heat-transfer label as claimed in claim 8 wherein said protective lacquer layer comprises a first methacrylate copolymer and a second methacrylate copolymer.

10. The heat-transfer label as claimed in claim 9 wherein said first methacrylate copolymer of said protective lacquer layer is a methyl/n-butyl methacrylate copolymer and wherein said second methacrylate copolymer of said protective lacquer layer is a methyl methacrylate copolymer.

11. The heat-transfer label as claimed in claim 10 wherein said first and said second methacrylate copolymers are present in said protective lacquer layer in a 3 to 2 ratio, respectively, by weight.

12. The heat-transfer label as claimed in claim 1 wherein said support portion comprises a sheet of paper and a release layer of polyethylene, said release layer of polyethylene being positioned above said sheet of paper.

13. A heat-transfer label comprising:

(a) a support portion;

(b) a skim coat of wax positioned above said support portion, said skim coat having a thickness corresponding to approximately 0.1–0.4 lbs. of wax spread over 3000 square feet; and (c) a transfer portion positioned above said skim coat for transfer of the transfer portion from the support portion to an article upon application of heat to the support portion while the transfer portion is placed into contact with the article, said transfer portion comprising:

(i) an acrylic protective lacquer layer;

(ii) an ink layer positioned above said acrylic protective lacquer layer; and (iii) an adhesive layer positioned above said ink layer.

14. The heat-transfer label as claimed in claim 13 wherein said acrylic protective lacquer layer comprises a first methacrylate copolymer and a second methacrylate copolymer.

15. The heat-transfer label as claimed in claim 14 wherein said first methacrylate copolymer of said acrylic protective lacquer layer is a methyl/n-butyl methacrylate copolymer and wherein said second methacrylate copolymer of said acrylic protective lacquer layer is a methyl methacrylate copolymer.

16. The heat-transfer label as claimed in claim 15 wherein said first and said second methacrylate copolymers are present in said acrylic protective lacquer layer in a 3 to 2 ratio, respectively, by weight.

17. The heat-transfer label as claimed in claim 13 wherein said support portion comprises a sheet of paper and a release layer of polyethylene, said release layer of polyethylene being positioned above said sheet of paper.

18. The heat-transfer label as claimed in claim 13 wherein said ink layer comprises a polyamide ink and/or an acrylic ink.

19. The heat-transfer label as claimed in claim 13 wherein said adhesive layer is heat-activatable and comprises an acrylic resin and a chlorinated polyolefin resin.

20. The heat-transfer label as claimed in claim 19 wherein said acrylic resin of said adhesive layer is a butyl methacrylate resin.

21. The heat-transfer label as claimed in claim 20 wherein said adhesive layer further comprises a plasticizer.

22. A method of labelling a styrene-acrylonitrile surface, said method comprising the steps of:

(a) providing a heat-transfer label, said heat-transfer label comprising:

(i) a support portion, and (ii) a transfer portion positioned above said support portion for transfer of the transfer portion from the support portion to a styrene-acrylonitrile surface upon application of heat to the support portion while the transfer portion is placed into contact with the styrene-acrylonitrile surface, said transfer portion comprising an adhesive layer, said adhesive layer comprising an acrylic resin and a chlorinated polyolefin resin; and (b) transferring said transfer portion from said support portion to the styrene-acrylonitrile surface.

23. The method as claimed in claim 22 wherein said transfer portion further comprises a protective lacquer layer and an ink layer, said ink layer being positioned above said protective lacquer layer, said adhesive layer being positioned above said ink layer.

24. The method as claimed in claim 22 wherein said transfer portion is in direct contact with said support portion.

25. The method as claimed in claim 22 further comprising a skim coat of wax, said skim coat being interposed between said support portion and said transfer portion and having a thickness corresponding to approximately 0.1–0.4 lbs. of wax spread over 3000 square feet.

26. The method as claimed in claim 22 wherein said acrylic resin of said adhesive layer is a butyl methacrylate resin.

27. The method as claimed in claim 26 wherein said adhesive layer further comprises a plasticizer.

28. The method as claimed in claim 27 wherein said plasticizer is glyceryl tribenzoate.

29. The method as claimed in claim 26 wherein said adhesive layer further comprises a plasticizer, said plasticizer being glyceryl tribenzoate, and wherein said butyl methacrylate resin constitutes about 65%, by weight, of said adhesive layer, said chlorinated polyolefin constitutes about 30%, by weight, of said adhesive layer and said glyceryl tribenzoate plasticizer constitutes about 5%, by weight, of said adhesive layer.

30. The method as claimed in claim 23 wherein said protective lacquer layer comprises an acrylic resin.

31. The method as claimed in claim 23 wherein said ink layer comprises a polyamide ink and/or an acrylic ink.

32. A method of labelling a styrene-acrylonitrile surface, said method comprising the steps of:

(a) providing a heat-transfer label, said heat-transfer label comprising:

(i) a support portion, and (ii) a transfer portion positioned above said support portion for transfer of the transfer portion from the support portion to a styrene-acrylonitrile surface upon application of heat to the support portion while the transfer portion is placed into contact with the styrene-acrylonitrile surface, said transfer portion comprising an acrylic protective lacquer layer; and wherein said transfer portion further comprises an ink layer, said ink layer being positioned above said protective lacquer layer, and an adhesive layer, said adhesive layer being positioned above said ink layer; and (b) transferring said transfer portion from said support portion to the styrene-acrylonitrile surface.

33. The method as claimed in claim 32 further comprising a skim coat of wax, said skim coat being interposed between said support portion and said transfer portion and having a thickness corresponding to approximately 0.1–0.4 lbs. of wax spread over 3000 square feet.

34. The method as claimed in claim 32 wherein said acrylic protective lacquer layer comprises a first methacrylate copolymer and a second methacrylate copolymer.

35. The method as claimed in claim 34 wherein said first methacrylate copolymer of said acrylic protective lacquer layer is a methyl/n-butyl methacrylate copolymer and wherein said second methacrylate copolymer of said acrylic protective lacquer layer is a methyl methacrylate copolymer.

36. The method as claimed in claim 35 wherein said first and said second methacrylate copolymers are present in said acrylic protective lacquer layer in a 3 to 2 ratio, respectively, by weight.

37. The method as claimed in claim 32 wherein said ink layer comprises a polyamide ink and/or an acrylic ink.

38. The method as claimed in claim 32 wherein said adhesive layer is heat-activatable and comprises an acrylic resin and a chlorinated polyolefin resin.

39. A transfer portion of a heat-transfer label, said transfer portion comprising:

(a) an acrylic protective lacquer layer;

(b) an ink design layer positioned above said acrylic protective lacquer layer, said ink design layer comprising an acrylic ink and/or a polyamide ink; and (c) an adhesive layer positioned above said ink design layer, said adhesive layer comprising an acrylic resin and a chlorinated polyolefin resin.

40. The transfer portion as claimed in claim 39 wherein said acrylic resin of said adhesive layer is a butyl methacrylate resin.

41. The transfer portion as claimed in claim 40 wherein said adhesive layer further comprises a plasticizer.

42. The transfer portion as claimed in claim 41 wherein said plasticizer is glyceryl tribenzoate.

43. The transfer portion as claimed in claim 40 wherein said adhesive layer further comprises a plasticizer, said plasticizer being glyceryl tribenzoate, and wherein said butyl methacrylate resin constitutes about 65%, by weight, of said adhesive layer, said chlorinated polyolefin constitutes about 30%, by weight, of said adhesive layer and said glyceryl tribenzoate plasticizer constitutes about 5%, by weight, of said adhesive layer.

44. The transfer portion as claimed in claim 39 wherein said protective lacquer layer comprises a first methacrylate copolymer and a second methacrylate copolymer.

45. The transfer portion as claimed in claim 44 wherein said first methacrylate copolymer of said protective lacquer layer is a methyl/n-butyl methacrylate copolymer and wherein said second methacrylate copolymer of said protective lacquer layer is a methyl methacrylate copolymer.

46. The transfer portion as claimed in claim 45 wherein said first and said second methacrylate copolymers are present in said protective lacquer layer in a 3 to 2 ratio, respectively, by weight.

* * * * *